LEGGETT & GITTUS.
Straw Cutter.
No. 51,116. Patented Nov. 21, 1865.
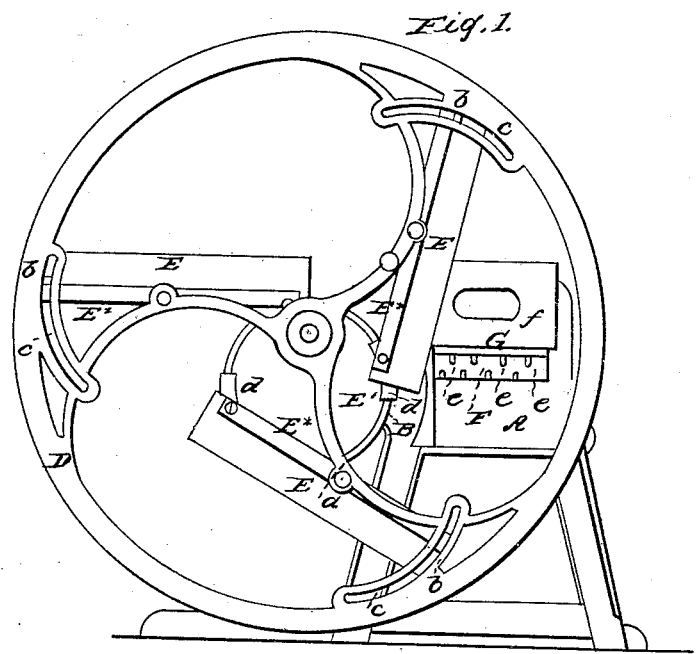
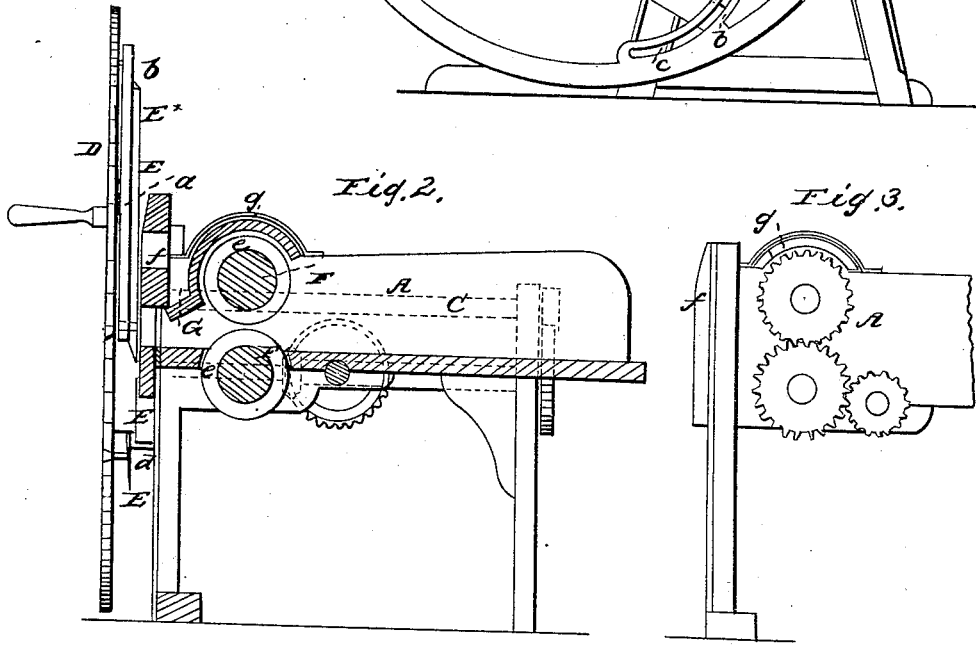
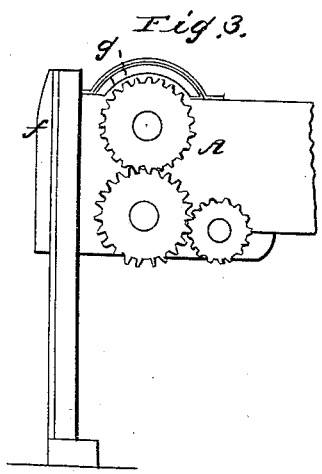

UNITED STATES PATENT OFFICE.

ROBT. LEGGETT AND ROBT. GITTUS, OF MILDENHALL, ENGLAND, ASSIGNORS TO A. B. CHILDS, OF ROCHESTER, NEW YORK.

IMPROVEMENT IN STRAW-CUTTERS.

Specification forming part of Letters Patent No. 51,116, dated November 21, 1865.

*To all whom it may concern:*

Be it known that we, ROBERT LEGGETT and ROBERT GITTUS, both of Mildenhall, in the county of Suffolk and Kingdom of England, have invented a new and Improved Machine for Cutting Straw, &c., and we do hereby declare that the following is a full, clear, and exact description of the same, reference being had to the accompanying drawings, making a part of the specification, in which—

Figure 1 represents a front elevation of our invention. Fig. 2 is a longitudinal vertical section of the same. Fig. 3 is a side elevation of the same.

Similar letters of reference in the three views indicate corresponding parts.

This invention relates to certain improvements in that class of machines for cutting straw, tobacco, or other similar products in which the knives are attached to a rotating wheel and hung upon pivots in such relation to the throat of the box that a regular shear cut is produced. The knives in this improved machine are hung on pivots, and they are governed by an eccentric-disk in such a manner that the cutting-edges preserve the most favorable position toward the material to be cut. A compound pressure-plate, consisting of a semicircular self-adjusting cap and vertically-sliding weight, prevents the possibility of choking, and finally the material to be cut is straightened out and fed to the knives in the proper direction by the action of grooved rollers, which send the separate straws or fibers of the material to be cut through the mouth of the box at right angles to the plane in which the knives revolves.

To enable those skilled in the art to make and use our invention, we will proceed to describe it.

A represents the box, which is intended to receive the material to be cut and to conduct it to the feeding and cutting mechanism. From this box two arms, B, extend, which form the bearings for the shaft C. This shaft extends throughout the entire length of the box, and mounted on one of its ends is the wheel D, which carries the knives E. These knives are hung at about the middle of their length on pivots $a$, which are firmly secured in the arms of the wheel, and their outer ends are provided with studs $v$, which are guided in slots $c$ near the circumference of the wheel D. These slots form segments of circles described from the pivots $a$ as the centers, and they prevent the knives from rotating round their pivots beyond certain limits. The inner end of the knives are pivoted to blocks $d$, which slide on the circumference of a stationary cam or disk, E′, placed eccentrically on the end of the shaft C. If the wheel D is rotated, an oscillating motion is imparted to each knife by the action of the disk or cam, and the cutting-edges throughout the whole cut are brought in the most favorable position for cutting.

The knife-blades are attached to heads E* by means of screws, so that they can be readily removed for the purpose of sharpening or replaced by new blades when worn out, and by the peculiar position and motion given to our knives we are enabled to use the blades up to the very heads, or nearly so, before it is necessary to replace them.

In turning the wheel D the cutting-edges pass down in front of the mouth or throat of the box A, through which the straw or other material is fed by the action of the feed-rollers F. These rollers, instead of being notched or grooved longitudinally, have deep ribs $e$ cast on them in planes at right angles to their axles, or, if desired, in planes more or less inclined, those of the top roller being inclined in one and those of the bottom rollers in the opposite direction. The ribs of the upper roller are so placed that they are opposite the grooves in the lower roller, and by the action of said ribs the separate straws or fibers of the material to be cut, when lying crosswise, are straightened out and passed through the mouth of the machine at right angles to the plane in which the knives revolve. On leaving the feed-rollers the material to be cut passes through under the compound pressure-plate G. This plate consists of two distinct parts, one being the vertically-sliding weight $f$ and the other the semicircular self-adjusting cap $g$. This cap fits closely to the circumference of the top feeding-roller, in order that the space between the vertical portion of the pressure-plate and the said roller shall always be completely filled up, so as to prevent any choking of the material to be cut.

In ordinary straw-cutters the edge of the pressure-plate in its descent gets farther and farther from the surface of the roller after passing its center, and thus leaves a large open space, into which the material to be cut is forced, giving it a chance of being deflected out of its proper course. With our compound pressure-plate the material to be cut passes continually under a smooth metallic surface, which prevents the possibility of choking.

We do not claim, broadly, as our invention the use in machines for cutting straw, &c., of a knife hung on a pivot and guided by a slot, such having been previously used and described in Letters Patent of the United States No. 13,137; but What we do claim as new, and desire to secure by Letters Patent, is—

1. The combination of the eccentric disk E', or its equivalent, with the pivoted knives E and guide-slots $c$, all arranged and operating substantially as and for the purpose shown and described.

2. The compound pressure-plate G, consisting of the vertically-sliding weight $f$ and semicircular cap $g$, in combination with the feed-rollers F, or their equivalents, constructed and operating in the manner and for the purpose substantially as specified.

ROBERT LEGGETT.
ROB. GITTUS.

Witnesses:
 JOHN VENN,
  71 *Cornhill, London, Notary Public.*
 JNO. WILLSDORY,
  *His clerk.*